(12) United States Patent
Gangadharan et al.

(10) Patent No.: US 9,509,745 B2
(45) Date of Patent: Nov. 29, 2016

(54) JAVA API FOR PROGRAMMING WEB REAL-TIME COMMUNICATION APPLICATIONS

(71) Applicant: Oracle International Corporation, Redwood Shores, CA (US)

(72) Inventors: Binod Pankajakshy Gangadharan, Bangalore (IN); Weigan Ji, Beijing (CN); Boris Selitser, Castro Valley, CA (US); Honggang Frank Zhu, Roswell, GA (US); Karthic Loganathan, New Albany, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 100 days.

(21) Appl. No.: 14/069,263

(22) Filed: Oct. 31, 2013

(65) Prior Publication Data

US 2014/0222957 A1   Aug. 7, 2014

Related U.S. Application Data

(63) Continuation-in-part of application No. 13/758,768, filed on Feb. 4, 2013.

(51) Int. Cl.
*G06F 15/16* (2006.01)
*H04L 29/08* (2006.01)
*G06F 9/44* (2006.01)

(52) U.S. Cl.
CPC ............... *H04L 67/02* (2013.01); *G06F 8/31* (2013.01); *G06F 8/36* (2013.01); *H04L 67/141* (2013.01); *H04L 67/34* (2013.01)

(58) Field of Classification Search
CPC . H04L 1/1838; H04L 69/328; H04L 9/0855; H04L 12/2818
USPC .......................... 709/203, 217, 220, 239, 200
See application file for complete search history.

(56) References Cited

U.S. PATENT DOCUMENTS 6,760,417 B1   7/2004   Wallenius
7,136,913 B2   11/2006  Linderman
(Continued)

FOREIGN PATENT DOCUMENTS

WO   2004007708   1/2014

OTHER PUBLICATIONS

Unknown Author, Oracle Communications Services Gatekeeper, Concepts and Architectural Overview, Release 4.1, Jan. 2009, pp. 1-1-A10.
(Continued)

*Primary Examiner* — El Hadji Sall
(74) *Attorney, Agent, or Firm* — Tucker Ellis LLP

(57) ABSTRACT

In accordance with an embodiment, described herein is a system and method for programming server-side real-time web communication applications. A JAVA application programming interface (API) is provided for web application developers to write JAVA applications on a server to control, manage, and mediate HTML5 endpoints that communicate with the JAVA applications. Each JAVA application can be a JAVA component that are annotated with a plurality of JAVA objects provided by the JAVA API, wherein the plurality of JAVA objects can also establish communication between HTML5 applications endpoints, and holding the state of the communication. The container can integrate with other enterprise technologies such as JMS and enable the JAVA applications to integrate with applications and services exposed by other providers, e.g., FACEBOOK. The JAVA API can be used to write applications that can connect with legacy IMS systems and services using existing JAVA APIs such as SIP servlet.

20 Claims, 8 Drawing Sheets

(56) References Cited

U.S. PATENT DOCUMENTS

| | | | |
|---|---|---|---|
| 7,483,438 B2 | 1/2009 | Serghi | |
| 7,716,240 B2* | 5/2010 | Lim | 707/781 |
| 8,185,548 B2* | 5/2012 | Lim | 707/781 |
| 8,296,409 B2* | 10/2012 | Banerjee et al. | 709/223 |
| 8,630,299 B1 | 1/2014 | Afshar | |
| 9,038,082 B2* | 5/2015 | Maes | 718/104 |
| 2002/0025795 A1 | 2/2002 | Sharon | |
| 2003/0028790 A1 | 2/2003 | Bleumer | |
| 2004/0009762 A1 | 1/2004 | Bugiu | |
| 2005/0245230 A1 | 11/2005 | Benco | |
| 2005/0262075 A1* | 11/2005 | Beartusk et al. | 707/8 |
| 2006/0248198 A1 | 11/2006 | Galchev | |
| 2007/0106801 A1 | 5/2007 | Jansson | |
| 2007/0143470 A1 | 6/2007 | Sylvain | |
| 2007/0156659 A1* | 7/2007 | Lim | 707/3 |
| 2008/0103923 A1 | 5/2008 | Rieck | |
| 2008/0189421 A1 | 8/2008 | Langen et al. | |
| 2008/0271113 A1 | 10/2008 | Belling | |
| 2009/0141704 A1* | 6/2009 | Eng et al. | 370/352 |
| 2009/0225760 A1 | 9/2009 | Foti | |
| 2009/0265607 A1* | 10/2009 | Raz et al. | 715/233 |
| 2009/0268715 A1 | 10/2009 | Jansson | |
| 2010/0114994 A1* | 5/2010 | Huang et al. | 707/811 |
| 2010/0142515 A1* | 6/2010 | Jana et al. | 370/352 |
| 2010/0183131 A1* | 7/2010 | Chang | 379/93.12 |
| 2010/0223287 A1* | 9/2010 | Lim | 707/769 |
| 2011/0072144 A1 | 3/2011 | Fikouras et al. | |
| 2011/0082920 A1 | 4/2011 | Bhattacharya | |
| 2011/0107156 A1* | 5/2011 | Miyata et al. | 714/49 |
| 2011/0209181 A1* | 8/2011 | Gupta et al. | 725/62 |
| 2011/0258305 A1* | 10/2011 | Chen et al. | 709/223 |
| 2011/0258597 A1* | 10/2011 | Chen et al. | 717/107 |
| 2012/0016932 A1* | 1/2012 | de Castro et al. | 709/203 |
| 2012/0045040 A1* | 2/2012 | Maes | 379/67.1 |
| 2012/0072548 A1 | 3/2012 | Kim | |
| 2012/0144416 A1* | 6/2012 | Wetzer et al. | 725/14 |
| 2012/0151373 A1* | 6/2012 | Kominac | G06F 17/30905 715/740 |
| 2012/0178420 A1* | 7/2012 | Ould | 455/411 |
| 2012/0233216 A1* | 9/2012 | Lim | 707/781 |
| 2012/0317474 A1* | 12/2012 | Parreira | 715/234 |
| 2013/0013804 A1* | 1/2013 | Traynor | 709/232 |
| 2013/0042152 A1* | 2/2013 | Fryc et al. | 714/38.1 |
| 2013/0058262 A1* | 3/2013 | Parreira | 370/276 |
| 2013/0067333 A1* | 3/2013 | Brenneman | 715/721 |
| 2013/0073393 A1* | 3/2013 | Nasr | 705/14.58 |
| 2013/0094445 A1* | 4/2013 | De Foy et al. | 370/328 |
| 2013/0097239 A1 | 4/2013 | Brown | |
| 2013/0104030 A1* | 4/2013 | Parreira | 715/234 |
| 2013/0232217 A1 | 9/2013 | Kristiansson | |
| 2014/0007083 A1* | 1/2014 | Baldwin et al. | 717/178 |
| 2014/0026120 A1* | 1/2014 | Gu et al. | 717/124 |
| 2014/0040437 A1* | 2/2014 | Mitsuya et al. | 709/219 |
| 2014/0044123 A1* | 2/2014 | Lawson et al. | 370/352 |
| 2014/0075472 A1* | 3/2014 | Mitsuya et al. | 725/32 |
| 2014/0095724 A1 | 4/2014 | Yoakum | |
| 2014/0126714 A1* | 5/2014 | Sayko | 379/265.09 |
| 2014/0156725 A1 | 6/2014 | Mandyam | |
| 2014/0181949 A1 | 6/2014 | Hunter | |
| 2014/0195588 A1* | 7/2014 | Badge et al. | 709/203 |
| 2014/0280522 A1 | 9/2014 | Watte | |
| 2015/0022619 A1* | 1/2015 | Aleixo Dinis Lopes et al. | 348/14.02 |
| 2015/0195309 A1 | 7/2015 | Opsenica | |

OTHER PUBLICATIONS

Unknown Author, BEA WebLogic Network Gatekeeper, Architectural Overview, Version 3.0, Sep. 14, 2007, pp. i-C14.

Chen, et al., Applying SOA and Web 2.0 to Telecom: Legacy and IMS Next-Generation Architectures, 2008, pp. 374-379, IEEE International Conference on e-Business Engineering.

Ericson, et al., JSR 309 Overview of Media Server Control API, Version: Media Server Control API v1.0, Sep. 30, 2009, 87 pages, Hewlett-Packard Development Company, L.P.

Kulkarni, et al., SIP Servlet Specification, Version 1.1, JSR 289 Expert Group, Aug. 1, 2008, 240 pages, BEA Systems, Inc.

* cited by examiner

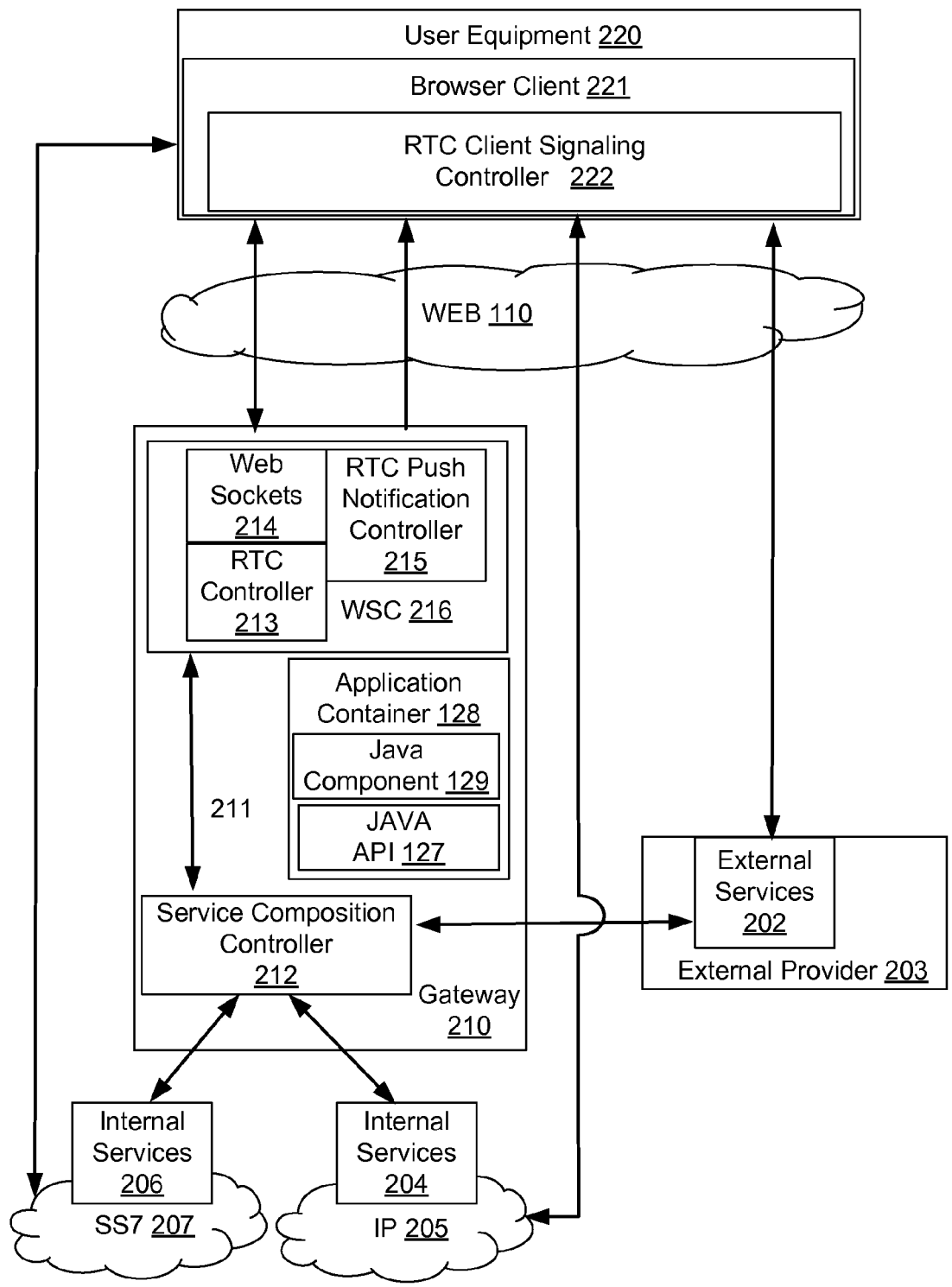

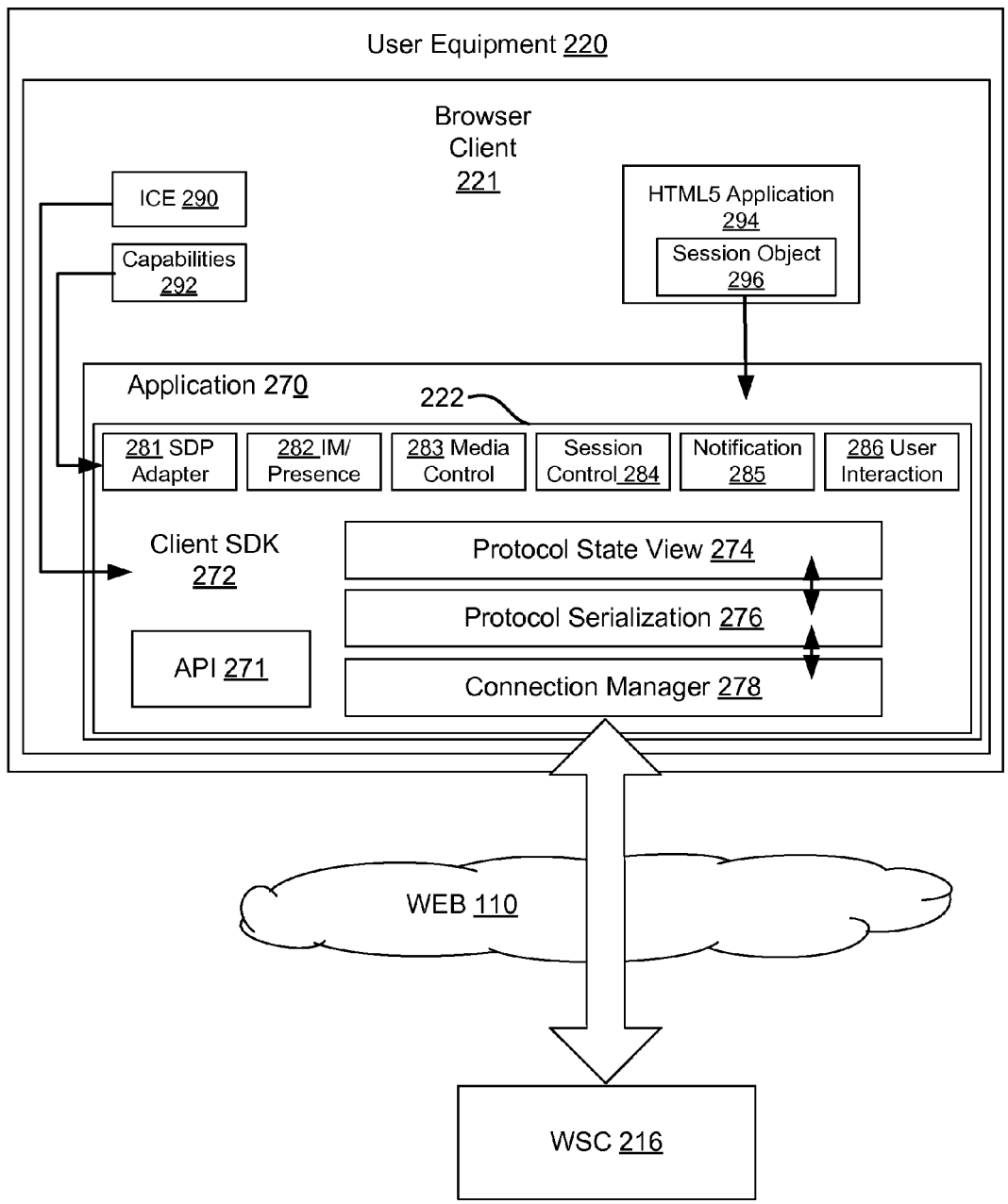

JAVA API FOR PROGRAMMING WEB REAL-TIME COMMUNICATION APPLICATIONS

CLAIM OF PRIORITY

This patent application is a continuation-in-part continuation of U.S. patent application Ser. No. 13/758,768, entitled "Real-Time Communication Signaling Gateway" filed Feb. 4, 2013 (Inventors: Honggang frank Zhu, Boris Selitser, and Karthic Loganathan), which application is incorporated herein by reference in its entirety.

RELATED CASES

This patent application is related to the following patent applications, which are hereby incorporated by reference in their entirety:

U.S. Patent Application entitled "SYSTEM AND METHOD FOR EXTENDING IP MULTIMEDIA SUBSYSTEM TO HTML5 ENVIRONMENTS", application Ser. No. 14/069,214, filed Oct. 31, 2013;

U.S. Patent Application entitled "JAVASCRIPT API FOR WEBRTC", application Ser. No. 14/069,236, filed Oct. 31, 2013;

U.S. Patent Application entitled "INTEGRATED WEB-ENABLED SESSION BORDER CONTROLLER", application Ser. No. 14/069,246, filed Oct. 31, 2013, now U.S. Pat. No. 9,473,581 issued Oct. 18, 2016;

U.S. Patent Application entitled "BROWSER/HTML FRIENDLY PROTOCOL FOR REALTIME COMMUNICATION SIGNALING", application Ser. No. 14/069,308 filed Oct. 31, 2013 now U.S. Pat. No. 9,331,967 issued May 3, 2016; and U.S. Patent Application entitled "GENERIC MODEL FOR CUSTOMIZING PROTOCOL BEHAVIOR THROUGH JAVASCRIPT", application Ser. No. 14/069,297 filed Oct. 31, 2013 now U.S. Pat. No. 9,307,031 issued Apr. 5, 2016.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a system and method for programming real-time communication web applications. In particular, the present invention relates to a JAVA API for programming server-side Web real-time applications.

BACKGROUND

With the explosive proliferation of IP-enabled mobile and fixed devices capable of offering Web, telecom and entertainment services, such as 3G/4G-enabled smart phones, TVs, home appliances, gaming consoles, and automobiles, among others, operators of mobile, broadband and fixed networks are faced with the operational and business challenges of delivering innovative IP-based communication services with maximum profitability. In order to achieve this goal, customers are increasingly migrating away from expensive, closed, proprietary and application-specific legacy platforms, and towards low-cost, open, standards-based unified converged application platforms, which dramatically lower the time and cost of adding new features and extensions to existing IP-based communication services.

Session Initiation Protocol (SIP) is a control (signaling) protocol developed to manage interactive multimedia IP sessions including IP telephony, presence, and instant messaging. SIP is widely used in telecommunication networks. SIP and other communications centric protocols are complex, and their implementation requires significant domain expertise. However, SIP is not readily compatible with HTTP and use in the Internet domain.

The IP Multimedia Subsystem (IMS) is an architecture for an integrated network of telecommunications carriers that would facilitate the use of IP (Internet Protocol) for packet communications in all known forms over wireless or landline. Examples of such packet communications include traditional telephony, fax, e-mail, Voice over IP (VoIP), instant messaging (IM), videoconference sessions and video on demand (VoD). IMS uses a Voice-over-IP (VoIP) and runs over the standard Internet Protocol (IP). IMS gives network operators and service providers the ability to control and charge for each service. IMS architecture has the capability to support existing phone systems (both packet-switched and circuit-switched). Thus, IMS provides the interoperability, security, session management and QoS capabilities that telecommunications providers lack and desire. IMS is the de facto standard for next-generation networks.

HyperText Markup Language (HTML) is the main markup language for creating web pages and other information that can be displayed in a web browser. HTML is written in the form of HTML elements consisting of tags. HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages. The purpose of a web browser is to read HTML documents and compose them into visible or audible web pages. The HTML environment has a well known behavior according to standards established by the World Wide Web Consortium (W3C) which is the main international standards organization for the World Wide Web (abbreviated WWW or W3).

HTML5 introduced WebRTC application programming interfaces (APIs) that make it possible for applications that use JavaScript in an HTML5 environment to take part in real-time communications. To make use of this capability, applications that reside in the browser environment of one user need to exchange messages with another application to establish media connections. However, the signaling process of exchanging and negotiating session information is not specified by W3C and is left to the application to implement. The problem is more complicated if it is desired to make a connection with a non-browser media endpoint like a traditional telephony equipment.

It would be desirable provide access to the network services made available in the IP Multimedia Subsystem (IMS) from the HTML environment, and in particular, the HTML environments capable of real-time communication environment, for example HTML5. However extending IMS architecture to the HTML environment is difficult owing to incompatibility of SIP with HTTP over TCP/IP and the requirement for domain expertise to overcome such incompatibility. There is presently no simple way to extend the network services of the IP Multimedia Subsystem (IMS) to HTML5 applications without radical changes to the IMS model and custom extensions to the HTML platform to permit a browser to be used as an endpoint for IMS services. Thus, despite the desire to extend the enhanced capabilities that IMS provides to the HTML environment, such integration has not been readily feasible.

It would therefore be desirable to provide a system and method for extending IMS architecture to the HTML environment which is effective and simple to implement.

It would further be desirable to provide a system and method for extending IMS architecture to the HTML environment without radical changes to the IMS model or custom extensions to the HTML platform.

It would further be desirable to provide a system and method for extending IMS architecture to the HTML environment which can be implemented without domain expertise.

It would still further be desirable to provide a system and method for extending IMS architecture to the HTML environment while also providing an application programming interface to facilitate programming of server-side applications without domain expertise.

SUMMARY

The present invention provides a system and method for extending IMS architecture to the HTML environment which overcomes the limitations of the state of the art.

The present invention provides a system and method for extending IMS architecture to the HTML environment which is effective and simple to implement.

The present invention provides a system and method for extending IMS architecture to the HTML environment without radical changes to the IMS model or custom extensions to the HTML platform.

The present invention provides a system and method for extending IMS architecture to the HTML environment which can be implemented without domain expertise.

The present invention provides a system and method for providing an application programming interface to facilitate programming of server-side applications without domain expertise.

In part, the system and method of the present invention provide a communication channel between an HTML-capable application or operating system and the IMS core of a telecommunications network utilizing an integrated web-enabled session border controller (WSBC) at the edge of the IMS architecture network. The system and method overcome the need for domain expertise of complex SIP and other communications centric protocols. The system and method provides a mechanism to combine complex signaling in the IMS telecommunications network into simple operations towards the Web. The present invention thereby provides a platform which enables telecommunications providers to provide a better end-to-end customer experience accessible from a wide variety of HTML-capable consumer devices.

In an embodiment, the system and method of the present invention comprise a client-side controller, a network-side controller, and a communications protocol for communicating between the client-side controller and the network-side controller. The client-side controller provides a client-side JavaScript API to interface with the HTML-capable application or operating system and encapsulate the HTTP signaling layer. The network-side controller component of the WSBC terminates the communications with the client-side, and parses and normalizes the communications into an internal protocol suitable for communication with IMS within legacy telecommunications network systems (for example SIP and the like). The communications protocol provides a communication channel which is compatible with transmission over the Internet domain.

With HTML5 WebRTC APIs, it is possible for applications that use JavaScript in a HTML5 environment like a web browser to take part in real time communications. Usually developers employ a centralized network-side server which mediates, manages and controls the users of HTML5 applications. A centralized server implementing a signaling engine can also communicate with non-HTML5 endpoints within an IMS core. Such centralized servers hold application logic which controls, manages and mediates the HTML5 endpoints, and also helps such applications to integrate closely with internet and cloud services that are exposed by other providers (e.g. FACEBOOK, GOOGLE, TWITTER etc.). These applications may also need to use one or more data storage technology like databases, files etc. They may also need to make use of other technologies like Messaging, Transactions, WebServices etc. For developers to write an application that spans all of these, they need a technology platform and API, which does not exist today. Accordingly, the present invention provides a JAVA application programming interface (API) which facilitates programming of server-side real-time communication applications.

In combination, the system and method of the present invention provides a JAVA application programming interface to facilitate programming of server-side real-time communication applications while simultaneously providing a dedicated "signaling" channel for all the applications on the server-side to interact with the HTML client using web real-time communications. Thus, in accordance with an embodiment of the invention, a JAVA-based component platform is provided. The component platform provides all standard JAVA components a developer will need to implement for handling the messages coming from HTML5 applications that employ WebRTC. The component platform also defines standard objects that are injected into such a component, which hold the state of the communication between one or more endpoints. These objects are specified at different scopes and hence have different lifecycles. They can be used to control the application model, control and data in an effective way.

Advantages of the JAVA API of embodiments of the present invention include: enabling developers to implement applications that leverage real-time communication capabilities in WebRTC; enabling developers to implement signaling between HTML5 endpoints; enabling developers to implement mashup and integration between WebServices; enabling developers to integrate application with other server side JAVA thereby providing access enterprise application capabilities like Data Persistence, Messaging, Transactions etc.

Other objects and advantages of the present invention will become apparent to those skilled in the art from the following detailed description of the various embodiments, when read in light of the accompanying drawings.

BRIEF DESCRIPTION OF THE DRAWINGS

FIG. 2A shows a system for real-time communication signaling according to an embodiment of the present invention.

FIG. 2D shows a client-side RTC signaling controller according to an embodiment of the invention.

DETAILED DESCRIPTION

Figure 1A:
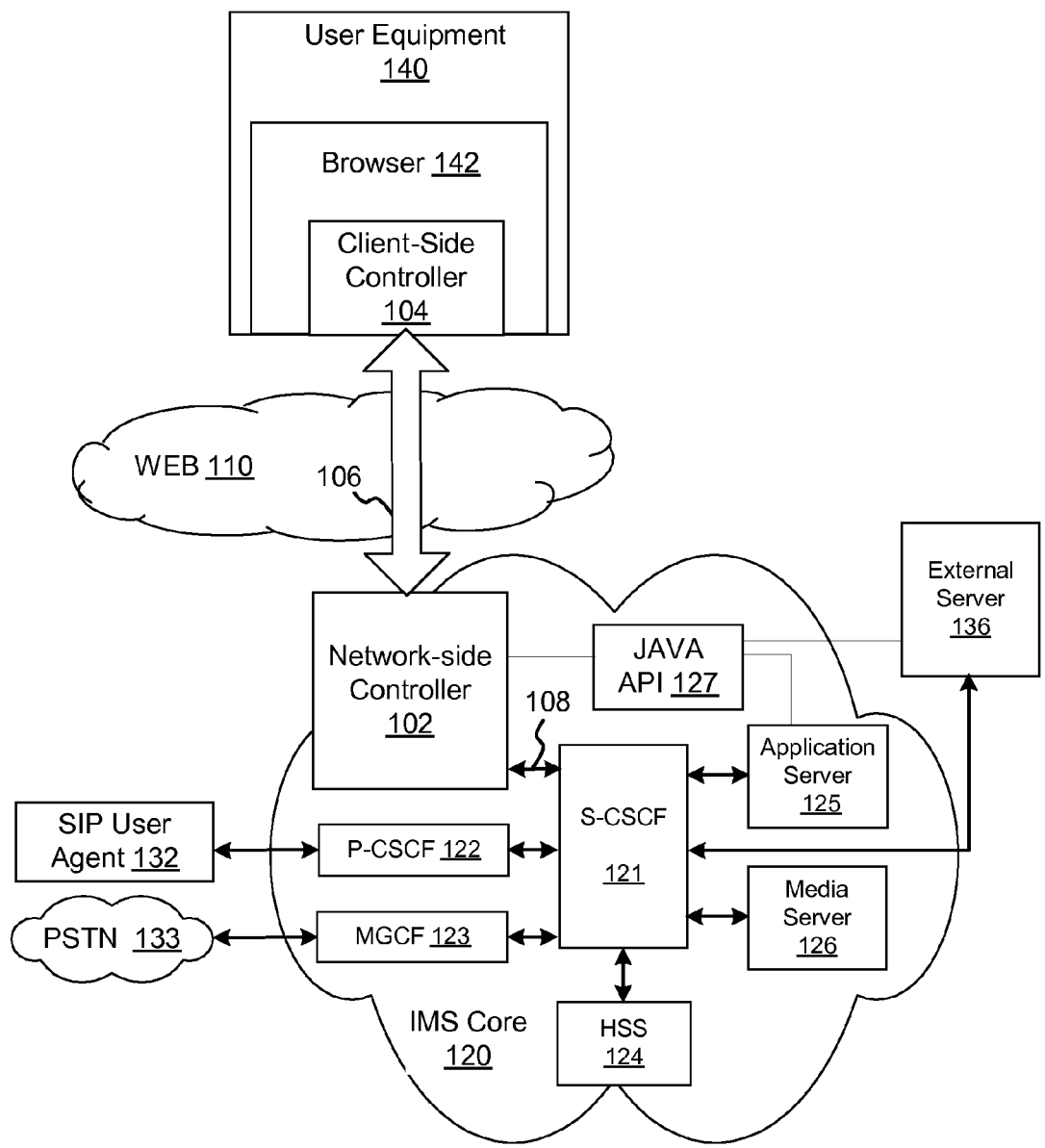
FIG. 1A shows an overview of a system for extending IP Multimedia Subsystem to HTML environments including a JAVA API according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

FIG. 1A shows an overview of a system and method for extending IP Multimedia Subsystem to HTML environments while utilizing a JAVA API according to an embodiment of the present invention. As shown in FIG. 1A, the system and method comprises a client-side controller 104, a network-side controller 102, and a communications protocol 106 for communicating between the client-side controller 104 and the network-side controller 102. The client-side controller 104, operating on User equipment 140, provides a client-side JavaScript API to encapsulate the HTTP signaling layer. The network-side controller 102 terminates the Internet domain communications with the client-side, and parses and normalizes the Internet domain communications into an internal protocol 108 suitable for communicating with elements of the IMS Core 120 within legacy telecommunications network systems (for example SIP and the like). The communications protocol 106 provides a communication channel which is compatible with communications over the Internet domain 110.

For developers creating server-side applications, the key is to leverage existing knowledge and skill set to minimize additional time and resources required by security features implementation. The network-side controller 102 is associated with an API 127 that supports multiple platforms running under multiple protocols and a set of client libraries to facilitate smooth development process. The network-side controller 102 also provides extensibility framework to extend the capabilities via protocol adaptors and API 127 for the web developers to call the functions of network-side controller 102 from their applications. The network-side controller 102 supports multiple signaling protocols and ensures correct mapping of the signaling message and routing of the messages based on routing profiles.

JAVA API 127 facilitates programming of server-side applications for WebRTC. JAVA API 127 is adapted to facilitate server-side applications for real-time communication with client-side controller 104. As shown in FIG. 1A, JAVA API 127 may be used in conjunction with any application servers performing real-time communication, including, but not limited to: networks-side controller 102, Application Server 125, and external application server 136.

WebRTC applications may be utilized in networks to control the signaling and media streams, setting up, conducting, and tearing down telephone calls or other interactive media communications; Security (e.g. protecting the network and devices from malicious attacks, fraud, and malformed packets, topology hiding and encryption); Connectivity (e.g. facilitate network communication by NAT traversal, SIP normalization, and VPN connectivity); Quality of Service (QoS policy can include traffic policing, resource allocation, rate limiting, call admission control, measurement of call statistics and quality; regulatory like lawful interception, media trans-coding, P-CSCF functionality, etc. JAVA API 127 facilitates programming of such applications. In an embodiment of the invention, JAVA API 127 can be used, for example, to write applications which allow network operators to manage WebRTC communications that are made on their networks, fix or change protocols and protocol syntax to achieve interoperability, and also overcome some of the problems that firewalls and network address translators (NATs) present for WebRTC communications.

Referring again to FIG. 1A, IMS Core 120 (IP Multimedia Subsystem or IP Multimedia Core Network Subsystem) is an architectural framework for delivering IP multimedia services. As shown in FIG. 1A IMS Core 120 comprises: S-CSCF 121; P-CSCF 122; Media gateway controller function (MGCF) 123; HSS 124; Application Server 125; and Media Server 126. These elements are shown as an example of conventional IMS architecture. IMS Core 120 may contain additional and/or different elements depending upon the implementation of a particular network. The present invention is not limited to any particular implementation of IMS Core 120. Indeed, it is a feature of the present invention that it extends whatever features are present in IMS Core to the Internet domain.

To ease the integration with the Internet, IMS uses IETF protocols wherever possible, e.g., Session Initiation Protocol (SIP). IMS Core 120 includes network elements designed to interact with SIP User Agents 132 and PSTN 133. As used herein, a user agent is an SIP endpoint that can be considered anything that either originates or terminates a SIP session, e.g., SIP Phones, Soft Phones, and the like. Typically such devices must be specifically designed to implement SIP in order to function as SIP User Agents 132. In addition IMS Core 120 can exchange signaling and media messages with a public switched telephone network (PSTN) 133. IMS Core 120 facilitates access to multimedia and voice applications from wireless and wireline terminals to create a form of fixed-mobile convergence (FMC). This is done by having a horizontal control layer that isolates the access network from the service layer. From a logical architecture perspective, services need not have their own control functions, as the control layer is a common horizontal layer.

Referring again to the IMS Core 120 shown in FIG. 1A, P-CSCF 122, represents the proxy call session control function which is an entry point for a SIP user agent 132, and authenticates users and establishes IP security integration with the SIP user agent 132. Media gateway controller function (MGCF) 123 is the entry point for signaling and media messages transmitted via public switched telephone network (PSTN) 114. MGCF 123 and P-CSCF 123 are used to process ingoing and outgoing SIP signaling packets in the IMS Core 120. On the network-side, MGCF 123 and P-CSCF 123 interact with S-CSCF 121 using Session Initiation Protocol (SIP).

S-CSCF 121 is the central node of the signaling plane. It is a SIP server, but also performs session control. S-CSCF 121 is located in the home network. It uses Diameter Cx and Dx interfaces to the Home Subscriber Server (HSS) 124 to download user profiles and upload user-to-S-CSCF associations. All necessary subscriber profile information is loaded from the HSS 124. S-CSCF 121 inspects every message from the SIP user agent 132 and/or other network elements, and decides where the SIP message should be forwarded for service provision. An Application Server AS 125 hosts and executes services, and interfaces with the S-CSCF 121 using SIP. Additionally a media server 126 provides media related functions such as media manipulation, e.g. voice stream mixing and interfaces with the S-CSCF 121 using SIP. S-CSCF 121 may also allow for provisioning of services and/or media services from an external server 136.

As described above, the elements of IMS Core 120 communicate with the central node of the signaling plane S-CSCF 121 using Session Initiation Protocol (SIP) (alternative session-oriented protocols may also be used). However SIP is not easily compatible with conventional protocols for transmission over the Web 110. Integration of IMS Core 120 is therefore difficult owing to incompatibility of protocols used in the two different environments and the requirement for domain expertise to overcome such incompatibility. The present invention provides a solution to such problems and therefore allows for extending the IMS Core 120 to the Web 110.

Network-side controller 102 is an entry point for HTTP traffic from Web 110. Network-side controller 102. Network-side controller 102 terminates Internet domain communications with the client-side, and parses and normalizes the Internet domain communications into an internal protocol 108 suitable for communicating with elements of the IMS Core 120 (e.g. S-CSCF 121) within legacy telecommunications network systems (for example SIP and the like). Network-side controller 102 has the ability to leverage applications in the IMS application server 125 instead of hosting a separate/custom business application on its own thus greatly simplifying integration with IMS Core 120. JAVA API 127 may be utilized to facilitate creation of WebRTC applications in Network-side controller 102 Application Server 125 and/or External Server 136. Network-side controller 102 communicates with client-side controller using a protocol 106 adapted to meet the real-time signaling requirements of SIP while remaining compatible with transmission over Web 110.

The client-side controller 104 operating on User equipment 140 provides client-side, JavaScript APIs to interface with HTML-capable applications/operating systems and encapsulate the HTTP signaling layer. The system and method 100 thereby provides a dedicated "signaling" channel for all the HTML-capable applications/OS on the User Equipment 140 to interact with the IMS Core 120 of the telecommunications network and/or HTML-capable applications/OS on other User Equipment (not shown).

User equipment 140 represents any HTML-capable device, including for example computing devices such as personal computers, laptops, desktops, notebooks, netbooks, tablets, mobile phones, and e-book readers. Moreover, HTML capabilities are being added to consumer devices, such as appliances, automobiles, set-top boxes, amplifiers, audio-visual components, televisions, projectors, and the like. HTML capabilities may be provided by a browser, for example, Safari, Firefox, Chrome Browser, and Internet Explorer. Alternatively, HTML capabilities may be a core component of the operating system, for example Chrome OS.

Figure 1B:
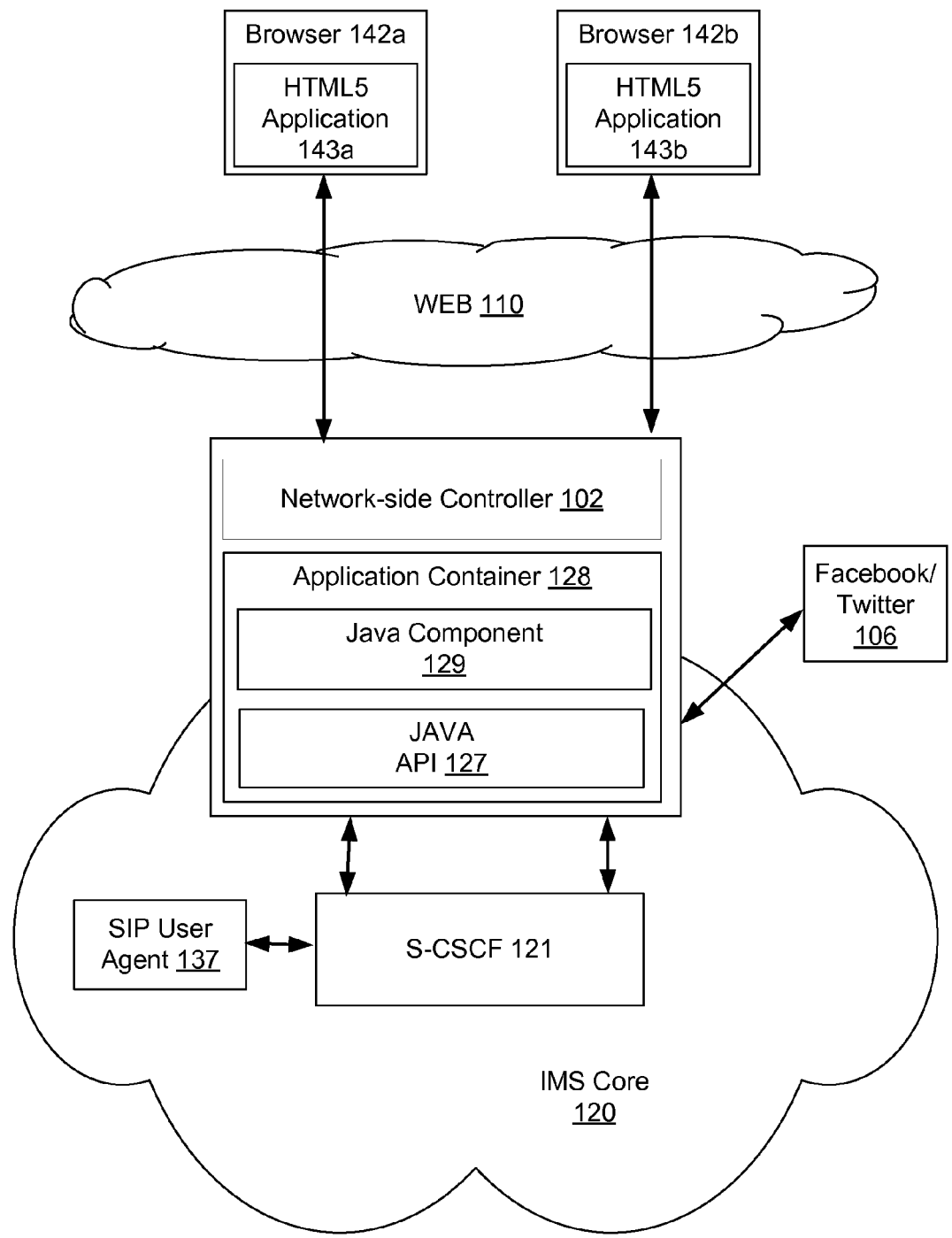
FIG. 1B shows aspects of the JAVA API of the system for extending IP Multimedia Subsystem to HTML environments of FIG. 1A according to an embodiment of the present invention.

FIG. 1B shows aspects of the JAVA API of the system for extending IP Multimedia Subsystem to HTML environments of FIG. 1A according to an embodiment of the present invention. Network-Side Controller 102 can act as a signaling server to support communications between HTML5 Applications 143a, 143b running in browsers 142a, 142b, and communications between the HTML5 Applications 143a, 143b running in browsers 142a, 142b and a non-browser client, e.g., SIP User Agent 137. The Network-Side Controller 102 can handle web signaling messages that come from the browser clients, e.g., browser clients 142a, 142b, and the non-web signaling messages that come from the non-browser clients, e.g., SIP User Agent 137. Network-Side Controller 102 can also act as a cross-protocol gateway that translates between the web signaling messages and the non-web signaling messages. Network-side controller may be associated with an Application Container 128 which includes a JAVA Component 129 the creation of which is facilitated by using JAVA API 127.

Referring again to FIG. 1B, JAVA component 129 can be deployed in an application container 128. The application container 128 can be an application server, a web signaling sever, or other software component, e.g., Oracle Communications Converged Application Server (OCCAS), that can provide a runtime environment to instantiate the JAVA component 107. The JAVA component 108 can act as a gateway between HTML5 applications 143a, 143b that are in browsers 142a and 142b respectively, and between an HTML5 application and a SIP user agent 137. In addition, the JAVA component 129 can implement logic which controls, manages, and mediates WebRTC communications between, e.g. HTML5 applications 143a, 143b. JAVA component 108 can integrate closely with internet and cloud services that are exposed by other providers, e.g., Facebook and Twitter 106.

Figure 1C:
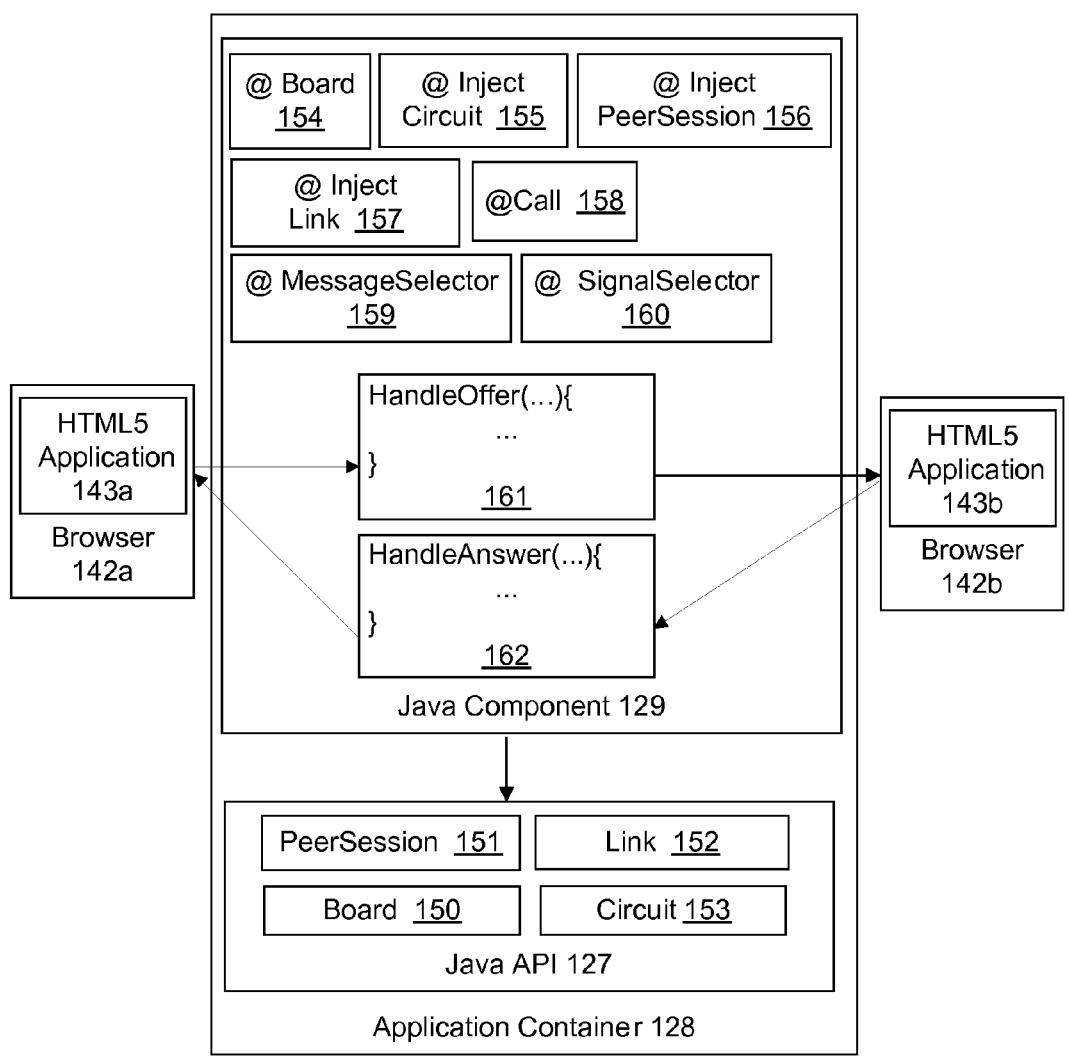
FIG. 1C shows the JAVA component annotated with JAVA objects of the JAVA API in an embodiment of the invention.

FIG. 1C shows the JAVA component 129 annotated with JAVA objects of the JAVA API 127 according to an embodiment of the invention. As shown in FIG. 1C, the JAVA API 127 consists of a plurality of JAVA objects, including, for example, a Board object 150, a Circuit object 153, a PeerSession object 151, and a Link object 152. These JAVA objects 150-153 are either annotated or injected in the JAVA component 129. With the annotations and injections, the application container 128 can instantiate these objects and make them available to JAVA component 129 without the developer writing boilerplate code to instantiate them.

In an embodiment of the invention, each objects of the JAVA API 127 may need a fair amount of boilerplate code to be instantiated. This boilerplate code can be generated automatically by a tool if the JAVA object is "decorated" with annotations. Injection is a special type of annotation that defines an injection point where the injected object can be instantiated by an application container 128. Annotations are often used by frameworks as a way of conveniently applying behaviors to user-defined classes and methods that must otherwise be declared in an external source, e.g., an XML configuration file or programmatically with API calls.

In an embodiment of the invention, the annotation of the Board object 154 can enable the JAVA component 129 to get instantiated by the application container 128. The Board object 154 can include functions and configurations that get the JAVA component 129 ready for accepting signaling messages from an HTML5 application 102 in a browser 101.

In an embodiment of the invention, a PeerSession object 156 can be the representation of a participant of WebRTC communication, e.g., a caller and a callee. The Circuit object 155 can be an interface or connection point where one or more PeerSession objects 156 can be attached to. For example, the JAVA component 129 can attach multiple participants, each represented by a PeerSession object 156, to the Circuit 155 to create a multi-party conference call. The Link object 157 can be a connection from a communication participant, e.g., the HTML5 application 143a, to the JAVA component 129. For example, it can be a WebSocket connection used to send or receive signaling messages exchanged between HTML5 application endpoints 143a, 143b. The PeerSession 156, the Link 157, and the Circuit 155 can be used by the JAVA component 129 to set up a platform to mediate the signaling between a caller and a callee.

In an embodiment of the invention, application developers can also create their own JAVA objects and inject them into the JAVA component 129. For example, a Call object 158 can be created to prepare and set up a PeerSession object 156. In an embodiment of the invention, the PeerSession object 156 for the caller can be populated with SDP information received from the HTML5 application 143a. The Call object 158 can also be injected into the JAVA component 129.

The JAVA component 129 can include a handleOffer( ) method 161 that gets executed in the JAVA component 129. This method can intercept the signaling messages from a caller, e.g. the HTML5 application 143a, and send them to a callee which can be an HTML5 application 143b, or a SIP user agent, such as traditional telephony equipment. In this JAVA method, application developers can insert business logic as appropriate, and help the JAVA component 129 to integrate closely with internet and cloud services that are exposed by other providers. Some examples are FACEBOOK, GOOGLE, TWITTER etc. The JAVA component 129 can also use one or more data storage technology like Databases and Files, and make use of other technologies like Messaging, Transactions, WebServices etc. by inserting business logic in this method. A call can be any media initiation from the HTML5 application 143a to the HTML5 application 143b.

In an embodiment of the invention, the handleOffer( ) method can process signaling messages based on the payload or protocol type. The annotated objects SignalSelector 160 and MessageSelector 159 can be instantiated by the application container 128 to make this selection. The SignalSelector 160 selects a signaling message to process based on the content of the payload of a signaling message; it does not depend on a protocol. The MessageSelector 159, however, can process protocol-specific messages, and has additional capabilities to inspect the contents of the signaling message, and decide whether to process it based on the action type of a signaling message. In an embodiment of the invention, protocol adaptors need to be deployed on the application container 128 for the MessageSelector 159 to work.

In an embodiment of the invention, the HandleAnswer( ) method 162 is where the HTML5 application 143b answers the call. Here the JAVA component 129 retrieves the PeerSession for the caller by the identifier of the caller contained in the Call object 158. The PeerSession for the caller has been created and attached to the Circuit 155 in the handleOffer( ) method 161. From the PeerSession 156 for the caller, a connection can be established through which signaling messages can be exchanged. Similarly in this method, business logic can be inserted, cloud services can mashed up, and other technologies like Messaging, Transactions, WebServices etc can be integrated with the JAVA component 129.

In an embodiment of the invention, the JAVA component 129 is a standard JAVA component that can be deployed as such. Additional methods can be added as application developers would normally do to a standard JAVA class. For example, a method can be added and implemented to handle JSONrtc, a proprietary protocol based on JSON and WebSocket.

The JAVA API 127 provides application developers a tool facilitating coding of JAVA applications that can be deployed on a server to interact with HTML5 applications in a browser environment and perform business logic as appropriate. In addition, JAVA applications written using the JAVA API 127 can serve as a platform to integrate with services and applications provided by third-party vendors.

In an embodiment of the invention, the JAVA API 127 can be used to write applications that can serve as a signaling gateway between HTML5 applications, and between HTML5 applications and non-HTML5 applications. To achieve this purpose, the JAVA API 127 can connect with legacy IMS systems and services using existing JAVA APIs such as SIP servlets, thus enabling protocol translation and creating a gateway with IMS services. In an embodiment of the invention, a JAVA application can be written using the JAVA API 127 with one side being a peer session and the other side being a SIP session or XMPP session, thus completing a protocol gateway.

Figure 1D:
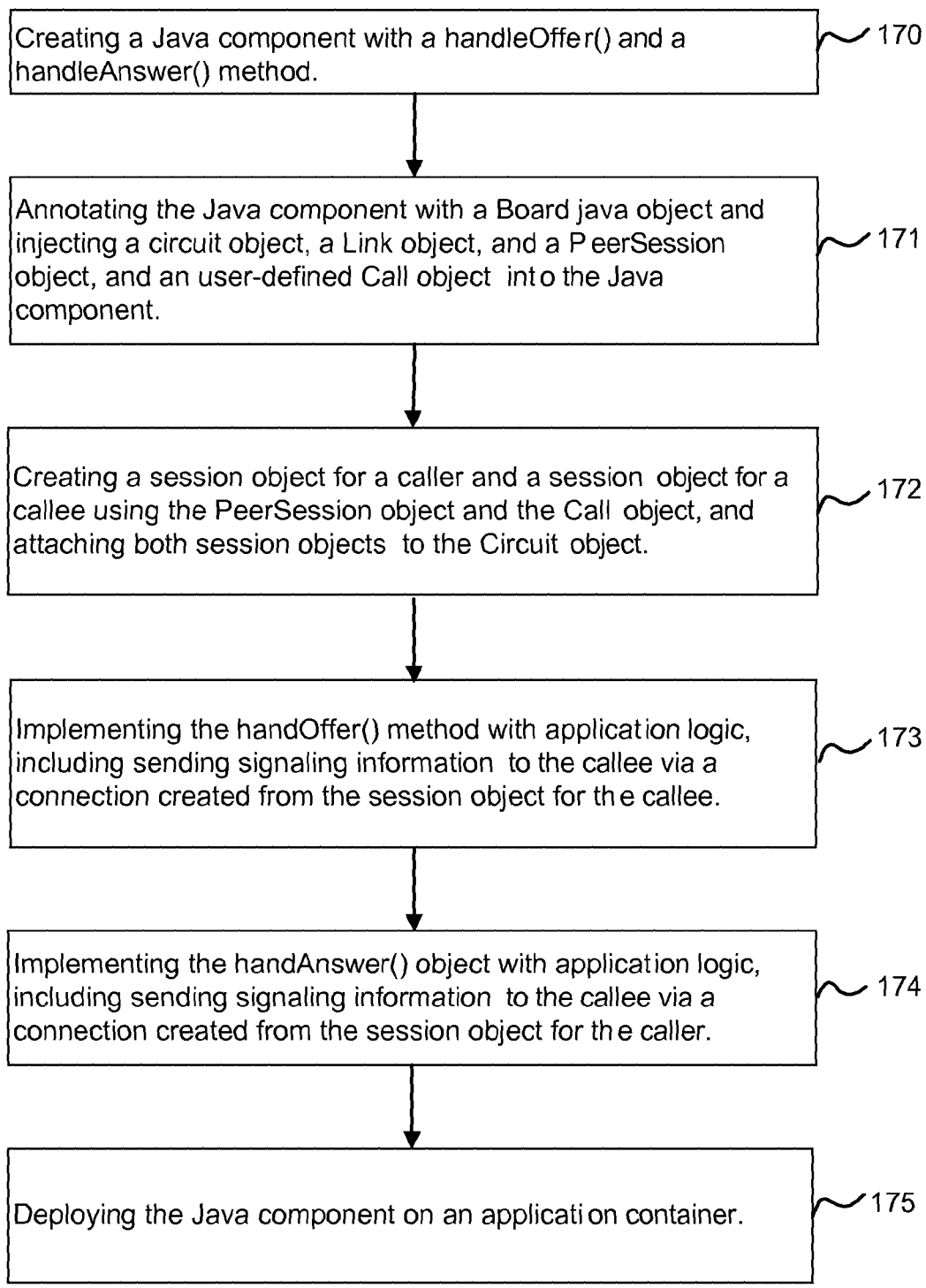
FIG. 1D shows a flowchart of a method for programming web applications according to an embodiment of the invention.

FIG. 1D is a flowchart of a method for programming web applications according to an embodiment of the invention. Application developers can start with creating a standard JAVA component with handleOffer( ) and a Handle Answer( ) methods at Step 170. At Step 171, the JAVA component can be annotated with the Board object and injected with a plurality of other JAVA objects, wherein the plurality of other JAVA objects includes a Link object, a Circuit object and a PeerSession object. These three objects can be used to set up a call between two or more HTML5 applications. The annotation and injections will allow the application container to instantiate an instance of each of these objects and make the instance available to the JAVA component. The Board object will enable the JAVA component to get ready for receiving signaling messages once those messages reach the container where the JAVA component will be deployed. The link object represents a connection from a HTML5 endpoint to the JAVA component and can be used to transfer signaling messages. For example, it can be a WebSocket connection.

Step 172 involves creating a session object for a caller and a session object for a callee using the PeerSession object and the Call object, and attaching both session objects to the Circuit object. The PeerSession object represents an HTML5 endpoint and contains information for the HTML5 application, e.g., an identifier of the HTML5 application. The Circuit object represents an interface that the JAVA component uses to attach two or more PeerSession objects, thus creating call between two or more parties, each party represented by a PeerSession.

At Steps 173 and 174, the application developer can write code to process the signaling messages based on a set of rules. For example, the processing logic can decide whether to process a signaling message based on the action type of the message. In addition, the business logic can be implemented here to perform desired actions, e.g., connecting to Facebook or Twitter, or integrating with other cloud services exposed by service providers. Finally at Step 175, the JAVA component can be deployed on an application server, e.g., Oracle's OCCAS.

An example of JAVA component can be illustrated as follows:

```
@Board
public class SwitchBoard{
    @Inject
    Link sender;
    @Inject
    PeerSession peerSession;
    @Inject
    Circuit circuit;
    @Inject
    Call call; //Application provided.
    @Inject
    Operator cache; //Application provided code.
    public void handleOffer
    //(@Observes @SignalSelector(payloadType = "offer") Signal signal)
    throws IOException {
        (@Observes @SignalSelector @MessageSelector(action =
        "start")
        Signal signal) throws IOException {
        circuit.attach(peerSession);
        PeerSession callee = call.setup(signal, peerSession);
        circuit.attach(callee);
        callee.getLink( ).send(signal);
    }
    public void handleAnswer
    (@Observes @SignalSelector(payloadType = "answer")
    Signal signal)
    throws IOException {
        PeerSession caller = circuit.getPeerSession(call.getCallerId( ));
        caller.getLink( ).send(signal);
    }
    public void handleJsonConnect
    (@Observes @SignalSelector @MessageSelector(action = "connect")
        Signal<Message,String> signal) throws IOException {
            cache.addLink(signal.getMessage( ).getInitiator( ), sender);
        }
}
```

Further details of an embodiment of a system for enabling the extension of the IMS Core to WebRTC communications are shown in FIGS. 2A-2D where network-side controller 102 is implemented as ORACLE™ WebRTC Session Controller (WSC) 216, which includes a signaling engine (WSC-SE) that handles the signaling and a media engine (WSC-ME) that handles the media.

FIG. 2A shows a gateway 210 for real-time communication signaling according to an embodiment of the present invention. As shown in FIG. 2A, Gateway 210 includes RTC Controller 213, RTC Push Notification Controller 215, and Service Composition Controller 212. RTC Controller 213 and RTC Push Notification Controller 215 interact with RTC Client Signaling Controller 222 over the Web 110. RTC Controller 213 communicates internally 211 using SIP with Service Composition Controller 212. Service Composition Controller 212 mediates provision of Internal Services 206, 204 and External Services 202 of an External Provider 203. RTC Push Notification Controller 215, RTC Controller 213 and WebSocket Interface 214 together comprise an embodiment of WSC 216. Gateway 210 may comprise Application Container 128, JAVA Component 129 and JAVA API 127 as previously described.

RTC Controller 213 provides scalable signaling over HTTP web-centric protocols for communicating over Web 110 with RTC Client Signaling Controller 222. RTC Controller 213 communicates with RTC Client Signaling Controller 222 via WebSocket interface 214. RTC Controller 213 provides a highly available, encapsulated front end interface to the web developer. The RTC Controller 213 terminates the Internet domain communications with the client-side by managing the WebSocket connections. The RTC Controller 213 also parses and processes the Internet domain communications. The RTC Controller 213 normalizes the Internet domain communications into an internal SIP for communication within Gateway 210. Thus, RTC Controller 213 communicates internally with Service Composition Controller 212 using a binary SIP.

Service Composition Controller 212 provides for service composition and orchestration across domains and different providers. The Service Composition Controller 212 also provides a unified layer to inject charging and policy control for differentiated service offerings. In an embodiment the functionality of Service Composition Controller 212 can be integrated in to a converged application server, for example ORACLE™ Communications Converged Application Server (OCCAS). Alternatively, the functionality of Service Composition Controller 212 can be integrated in to a service controller, for example ORACLE™ Communications Service Controller (OCSC).

Service Composition Controller 212 adopts and reuses existing internal communication services with support for different signaling protocols. Thus, for example, Service Composition Controller 212 can mediate: Internal Services 206 providing network telephony signaling using the SS7 protocol 207; and Internal Services 204 providing services using internet protocol 205. Service Composition Controller 212 and Gateway 210 may be implemented using Application Container 128, JAVA Component 129 and JAVA API 127 as previously described.

Service Composition Controller 212 can also mediate the provision of external services 202 provided by an external service provider 203. Communication with external provider 203 can be conducted using a selected signaling protocol SIP, XMPP etc as required by the external provider 203. Services provided by external provider 203 can include web services provided over Web 110 to a browser client 221 on user equipment 220. Service Composition Controller 212 thus enables external providers of over-the-top ("OTT") services to provide OTT services to users/clients. The gateway system enables the external providers to make use of the real-time communication signaling over IMS. The users/clients can then access web applications provided by external providers from a browser on the user equipment.

The gateway system acts as the IMS proxy for both HTML5 and external providers by taking advantage of WebSocket technology, to enable and expedite the IMS deployment. The WebSocket Protocol defines a mechanism for fast, secure, two-way communication between a client and a server over the Web. Data is transferred over a full-duplex single socket connection, allowing messages to be sent and received from both endpoints in real-time. To establish a WebSocket connection, a specific, HTTP-based handshake is exchanged between the client and the server. If successful, the application-layer protocol is "upgraded" from HTTP to WebSocket, using the previously established TCP transport layer connection. After the handshake, HTTP is no longer used and data can be sent or received using the WebSocket protocol by both endpoints until the WebSocket connection is closed.

RTC Client Signaling Controller 222 is resident on user equipment 220 and manages multiplexing of signaling request/response for all client-side applications mediating communication with RTC Controller 213 over HTTP web-centric protocols. The particular HTTP protocol used can be defined as required by the particular native or external service, for example, JSON, XML, XMPP, Skype protocol etc. A client-side library of available protocols is provided as part of an SDK in order to extend the services to the client.

For telephony applications low power consumption by user equipment 220 is desirable. Accordingly RTC Client Signaling Controller 222 can be placed in standby operation when not involved in signaling. Moreover WebSocket protocol must be initiated from the client-side and is also responsible for keeping the connection alive. Thus, the RTC Client Signaling Controller 222 will shut down the WebSocket Connection when there is no traffic. RTC Push Notification Controller 215 can be used by RTC Controller 213 to "wake-up" RTC Client Signaling Controller 222 from the standby state in order to resume communication. The RTC Push Notification Controller 215 may, in some embodiments, also be used for other notifications such as call notifications, message notifications, and the like. In an alternative embodiment, the keepalive and pingpong capabilities of the WebSocket protocol may be used to maintain WebSocket connection.

RTC Push Notification Controller 215 includes a server-side HTTP connection based Push Notification to wake up the client-side signaling process. RTC Client Signaling Controller 222 can utilize any push notification mechanism and protocol effective for user equipment 220. For example, RTC Push Notification Controller 215 can utilize the SMS message system to activate RTC Client Signaling Controller 222, thereby causing RTC Client Signaling Controller 222 to reactivate the WebSocket connection with the RTC Controller 213.

Figure 2B:
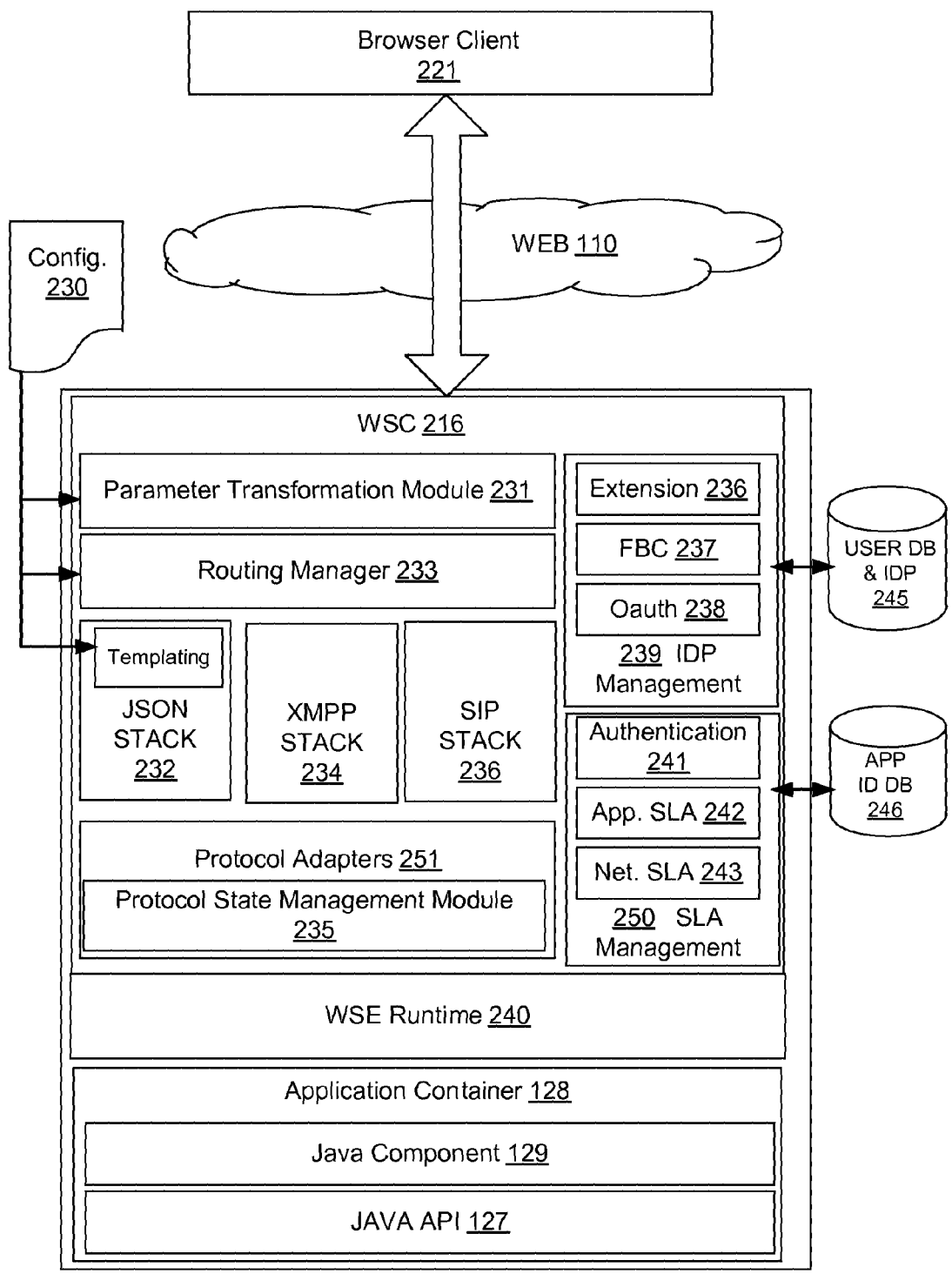
FIG. 2B shows a server-side WebRTC Session Controller according to an embodiment of the invention.

FIG. 2B shows an embodiment of server WSC 216 according to an embodiment of the invention. WSC 216 is deployed between the browser client 221 and the service composition controller 212 for exposing the internal and external services 206, 204, 202 to the client browser 221 (see FIG. 2A). WSC 216 enables the browser as a client for the network services and hence acts as a browser adapter. WSC 216 enables browser client management and ensures reliability of the service end to end (browser to network). WSC 216 may be associated with Application Container 128, JAVA Component 129 and JAVA API 127 as previously described. WSC 216 provides a number of features to the carriers and enterprise customers as described below.

WSC 216 including runtime module 240 supports multiple signaling protocols and ensures correct mapping of the signaling message using parameter transformation module 231 and correct routing of the messages based on routing profiles using routing manager 233. Parameter transformation, routing and JSON templating are all configurable using a configuration file 230.

WSC 216 performs protocol mapping between the selected client-side protocol and the network side protocol (SIP). For example, WSC 216 is adapted to receive a JSON message, parse the SDP information and map it to other supported protocols (SIP/XMPP). WSC 216 maintains a data definition for the format to parse to. When the JSON request is received at WSC 216, the transformation between the data definition and the JSON message structure must be implemented.

WSC 216 acts as a cross protocol signaling engine. WSC 216 handles the protocol associated state as demanded by the protocol. When WSC 216 is acting as a cross-protocol gateway, for example, JSON/WebSocket to SIP, the SIP side of WSC 216 maintains the transaction and dialog state. WSC 216 includes a protocol state management module 235 which manages the protocol state and ensures state replication for reliability of message exchange. WSC 216 has the ability to manage enormous amounts of concurrent client connections in order to be able to scale to the applications and users on the web.

For developers, the key is to leverage existing knowledge and skill sets to minimize additional time and resources required by security features implementation. WSC 216 comes with APIs that support multiple platforms running under multiple protocols and a set of client libraries to facilitate smooth development process. WSC 216, thus, additionally provides an extensibility framework to extend the capabilities via protocol adaptors 251 and APIs for the web developers to call the WSC functions from their applications. The extensibility may be supported by Application Container 128, JAVA Component 129 and JAVA API 127 as previously described.

WSC 216 provides signaling adaption such that WSC 216 handles all the signaling between the browser client 221 and the network end point (SIP Proxy, PSTN Gateway for example). WSC 216 is adapted to handle the message exchange using several protocols over WebSocket (RFC 6455) including, for example: JSON based protocol via JSON Stack 232; XMPP sub-protocol via XMPP Stack 234; SIP sub via SIP Stack 236; BOSH (XEP-0124); and COMET (Bayeux protocol) (not shown). On the network/carrier side the WSC supports translation into a suitable communication protocol or protocols (e.g. XMPP, SIP and the like). Thus, for example, on the network/carrier side, WSC 216 supports SIP (RFC 3261).

Security for real-time communication over the Web requires that the communicating endpoints be able to authenticate each other. While these end points are making calls through the signaling services, their identities are authenticated via an Identity Provider Management Module (IDP) 239 that supports OAuth 238, Facebook Connect (FBC) 237 and other Identity Protocols using extensions 236 (e.g. OpenID connect). IDP Management modules 239 interact with internal and/or external user database and identity servers 245.

WSC 216 thereby acts as an identity service that can attest the identity of the caller of the received request and map it to the "from" identity of the outbound call. For example, WSC 216 includes OAUTH module 238 which introduces security functions that authenticate and authorize the browser-based applications to interact with the network services. WSC 216 thereby provides service providers with the ability to control any third party partner's access and usage of its network capabilities.

Establishing real-time communication over the Web also utilizes verification of service level agreements (SLA) for the user and application. SLA Management module 250 includes an authentication module 241, as well as an application SLA module 242 and network SLA module 243 which communicate with internal and/or external databases 246 to verify that the communications are provided in conformance with the relevant service level agreements for the user and application.

In a particular embodiment, WSC 216 defines a JavaScript Object Notation (JSON) protocol that is used for exchanging information and to control the set up of media between a browser client 221 and WSC 216. JSON is a lightweight data-interchange format however other data-interchange formats may be used in alternative embodiments. The JSON protocol can be used on multiple transports (COMET, BOSH, and WebSocket). When used on WebSocket transport, the protocol is defined as a sub-protocol of the WebSocket protocol.

The JSON protocol (or alternative data-interchange format) defines the basic structure for the information transfer between the browser client 221 and WSC 216. The JSON protocol defines the minimum set of messages and state machinery necessary to implement the offer/answer model. The JSON protocol defines the message structure that accounts for the reliability (reconnect, retransmissions, timeouts etc) of the message. The JSON protocol also handles the necessary headers to function in multilevel secure environment (security headers).

WSC 216 also provides an internal routing manager 233 for the routing of the requests to the appropriate end nodes based on variety of parameters. There are multiple WSC instances (see FIG. 2C) and each instance is connected to the network node serving the functionality. The incoming requests (JSON messages, for example) have to be routed to the right application and instance. WSC 216 uses routing manger 233 to route incoming requests based on their origination and destination. WSC 216 provides functionality including performing look-ups and route requests for JSON to SIP, JSON to XMPP, SIP to XMPP, XMPP to SIP. Each route in the routing manager 233 has a routing profile. WSC 216 provides a default routing profile and additional routing profiles are configurable as needed or desired.

Figure 2C:
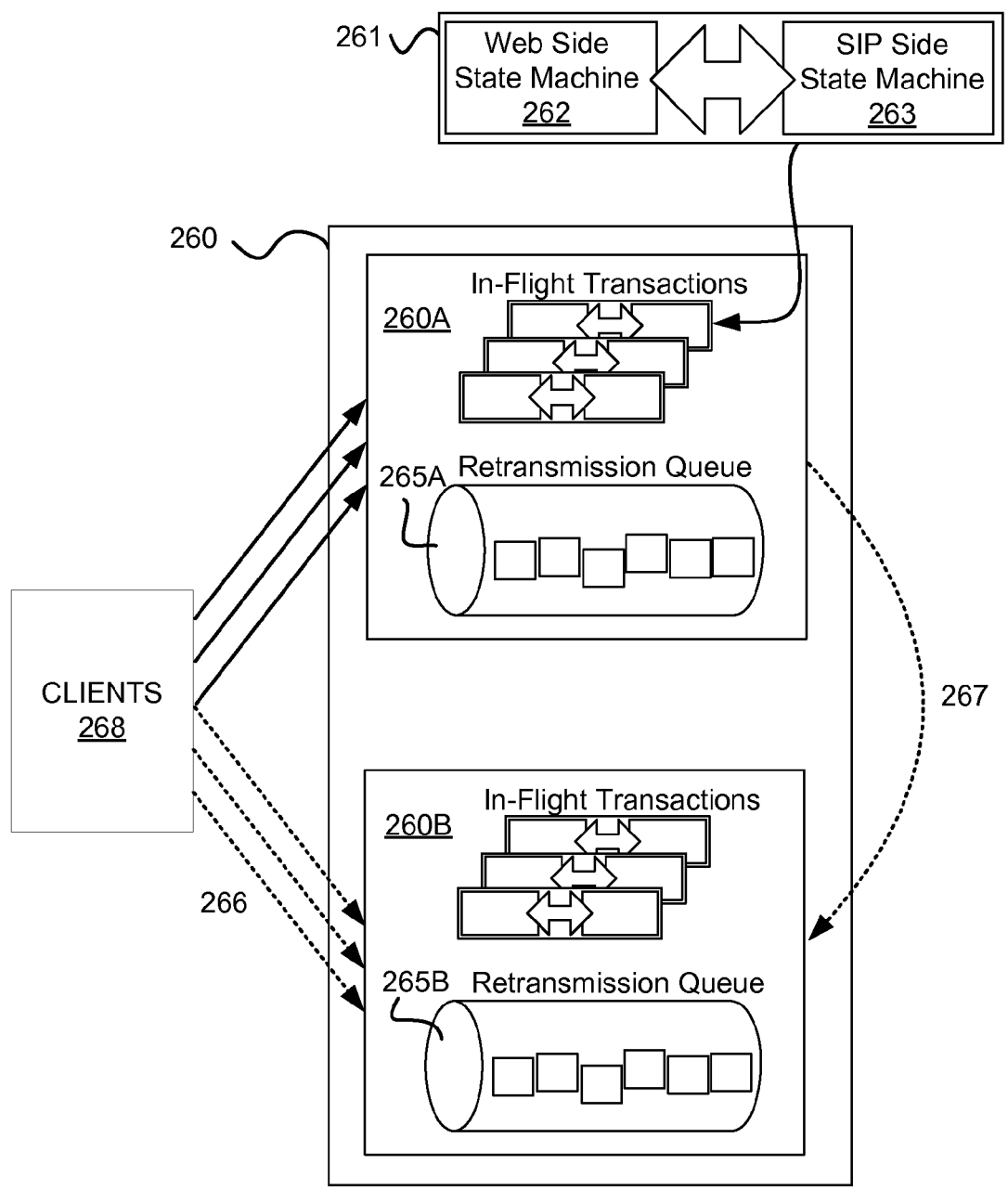
FIG. 2C shows an aspect of the server-side WebRTC Sesson Controller of FIG. 2B according to an embodiment of the invention.

FIG. 2C shows an aspect of WSC 216 of FIG. 2B according to an embodiment of the invention. WSC 216 maintains session control information, protocol state, dialog state, transaction state. WSC 216 provides for state maintenance and session state mapping across protocols. WSC 216 also enables hooks into the media session state. WSC 216 also maintains the SDP Agent information. WSC 216 operates to ensure reliable message exchange with clients 268.

WSC 216 ensures reconnection of clients due to failover or loss of connectivity. Clients and servers use an implicit sequence numbering protocol for the message transported by the connection. Clients and the servers each maintain their own sequence number. Both client and server acknowledge their receipt of messages by sending acknowledgement ("ack") messages. As per the protocol, an ack message indicates that the message has reached the destination (as well as all the messages lower than that sequence). Similarly an error message shall be defined (as in the JSON protocol section) to indicate that the message with a sequence number has met with an error. Retransmission Queue 265A, 265B allows for retransmission of messages for which there is an error or lack of acknowledgement.

One way in which WSC 216 maintains reliability is to keep the relevant conversation state redundant across different servers 260A, 260B having instances of WSC 216. WSC 216 provides for state maintenance and session state mapping across protocols. The relevant conversation state includes a Web Side State Machine 262 and SIP Side State Machine 263 for each In-Flight Transaction 261. WSC 216 maintains the session states (both client and server side state) in the cache. In order to ensure reliability, the cached copy of the state machines is duplicated on several servers. Additionally retransmission queue 265A, 265B is duplicated across servers 260A, 260B. WSC 216 uses coherence for state storage and management. If a server, for example server 260A cannot be contacted due to a network failure WSC 216 ensures that the state is retrieved from another active server 260B as shown by the dashed arrows 267, 266.

FIG. 2D shows an implementation of a client-side RTC signaling controller 222 as shown in FIG. 2A according to an embodiment of the invention. In an embodiment client-side RTC signaling controller 222 is implemented as part of an application 270 running on a browser client 221 (for example a JSS/CSS/HTML5 application). Application 270 is resident on user equipment 220 such that RTC signaling controller 222 manages multiplexing of signaling request/response for all client-side applications mediating communication with WSC 216, WSC 216 (see FIGS. 2A and 2B). Application 270 includes IM/presence module 282, media control module 283, notification module 285, and user interaction module 286.

In an embodiment application 270 is a JavaScript Application. Application 270 operates at a high level without having to deal with peer connection directly. The browser client 221 is stateless and contains as little of the implementation of the transport establishment code as possible. Browser client 221 identifies the capabilities 292 of the browser client 221 and user equipment 220 for streaming media. The capabilities 292 are provided to the SDP adapter 281 of the application 270. SDP adapter 281 provides a description of streaming media initialization parameters—a session profile—suitable for streaming media to the browser client 221—running on user equipment 220.

A client-side library of available protocols is provided as part of a Client SDK 272 in order to extend the services to the browser client 221. The particular HTTP protocol used can be defined as required by the particular native or external service, for example, JSON, XML, XMPP, Skype protocol etc. In a preferred embodiment a JSON protocol is used for communication between client-side RTC signaling controller 222 and WSC 216 as described above.

Protocol serialization 276 interacts with protocol state view 274 and connection manger 278 to communicate with WSC 216 over Web 110. Session Control 284 establishes reliable connection with WSC 216. This session can be used by the application 270 to create or invoke other objects.

RTC signaling controller 222 comprises a JavaScript SDK 272 which provides the functions necessary for application 270 to manage server connections (connection establishment, teardown via WebSocket). The JavaScript SDK 272 provides functions necessary to handle the state machine and functions to deal with interoperability issues. For example, the JavaScript SDK 272 of application 270 provides functions to create messages or insert messages into the state machine. The JavaScript SDK 272 also provides functions for the client to monitor connection health, including the ability to reconnect in case of stale connections and the ability to synchronize state from the server and add modified state back to the server.

JavaScript SDK 272 also provides an application programming interface (API) 271 which can modify and optimize media parameters, session description protocol (SDP), etc. The API 271 abstracts out complex functionality and provides API to deal with the real-time communication session, Call etc. The API 271 provides the ability to handle call states, media states, subscriptions and notifications.

In operation, HTML5 applications 294 access the JavaScript APIs to get access to various communication objects as defined in the API 271. An HTML5 application 294 will create a session object 296. The session object acts as browser side representation of the communication. From session object 296, application 270 can create different communication objects like Call, Subscription etc. The HTML5 application can listen on the callbacks from the objects to receive incoming calls, notifications, media in the call, state changes etc.

The Interactive Connectivity Establishment (ICE) draft, developed by the IETF's MMUSIC working group, provides a framework to unify the various NAT traversal techniques. ICE defines a standardized method for clients to determine what type of firewall(s) exist between clients and determine a set of IP addresses by which clients can establish contact. When an ICE-enabled client (the initiator) wishes to communicate with another device (the responder), it first collects information on addresses where the client can receive IP traffic. A key benefit that ICE provides is the ability to unify the information provided by these various sources of IP address information to create as many paths as possible by which the endpoints can be reached.

For real-time communication over the Web, the ICE state machine 290 is maintained by the browser client 221. When the browser client 221 reloads, the application 270 has no knowledge of the ICE Candidates and is forced to perform ICE restart. In order to avoid this, application 270 can save this information in WSC 216. When the initial ICE negotiation finishes, the browser client 221 sends the nominated ICE candidate pair of IP addresses to the application 270 which saves this information in WSC 216. When the browser client 221 reloads, the application 270 will fetch the nominated ICE candidate information from the server, and then send it to the browser client 221. This will tell the browser client 221 to use these candidates for media transfer. Since the browser client 221 has kept the local nominated ICE candidate alive all the time, as long as the remote side has not released the call, the transfer will succeed.

Although the invention has been described above with respect to communication services in a telecommunications network, the invention also finds application in any situation where it is necessary or desirable to provide real-time communication signaling.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for creating web real-time communication applications on a server, comprising:
   a computer with one or more microprocessors;
   an HTML5 application that sends signaling messages to a remote client using a web-centric signaling protocol;
   a JAVA component on the computer, wherein the JAVA component is annotated with a plurality of JAVA objects provided by a JAVA application programming interface (API), wherein the plurality of JAVA objects set up communication and hold a state of the communication between the HTML5 application and the remote client; and
   wherein the Java component is implemented by a web real-time communication application to serve as a signaling gateway between the HTML5 application and the remote client.

2. The system of claim 1, where the JAVA component is deployed on a signaling software component that handles real time communication using one or more web-centric signaling protocols.

3. The system of claim 1, wherein the plurality of JAVA objects are specified at different scopes and hence have different lifecycles.

4. The system of claim 1, wherein the plurality of JAVA objects include an object that enables the JAVA component to be instantiated by a container and be executing upon the container receiving the signaling messages from the HTML5 application.

5. The system of claim 4, wherein the container enables integration of the JAVA API with existing server side JAVA technologies.

6. The system of claim 1, wherein the JAVA component, upon receiving the signaling messages, processes the signaling messages and route the signaling messages to a different endpoint other than the remote client.

7. The system of claim 1, the plurality of JAVA objects include an object that enables the JAVA component to create an interface to which one or more sessions are attached.

8. The system of claim 1, wherein the JAVA API integrates with existing server-side communication APIs, creating a gateway with IMS services and enabling protocol translation.

9. A method for creating web real-time communication applications on a server, comprising:
- providing an HTML5 application that sends signaling messages to a remote client using a web-centric signaling protocol;
- providing a JAVA component executing on one or more microprocessors, wherein the JAVA component is annotated with a plurality of JAVA objects provided by a JAVA application programming interface, wherein the plurality of JAVA objects set up communication and hold a state of the communication between the HTML5 application and the remote client; and
- wherein the Java component is implemented by a web real-time communication application to serve as a signaling gateway between the HTML5 application and the remote client.

10. The method of claim 9, where the JAVA component is deployed on a signaling software component that handles real time communication using one or more web-centric signaling protocols.

11. The method of claim 9, wherein the plurality of JAVA objects are specified at different scopes and hence have different lifecycles.

12. The method of claim 9, wherein the plurality of JAVA objects include an object that enables the JAVA component to be instantiated by a container and be executing upon the container receiving the signaling messages from the HTML5 application.

13. The method of claim 12, wherein the container enables integration of the JAVA API with existing server side JAVA technologies.

14. The method of claim 9, wherein the JAVA component, upon receiving the signaling messages, processes the signaling messages and route the signaling messages to a different endpoint other than the remote client.

15. The method of claim 9, the plurality of JAVA objects include an object that enables the JAVA component to create an interface to which one or more sessions are attached.

16. A non-transitory computer readable storage medium, including instructions stored there on which, when executed by a computer, cause the computer to perform the steps comprising:
- providing an HTML5 application that sends signaling messages to a remote client using a web-centric signaling protocol;
- providing a JAVA component executing on one or more microprocessors, wherein the JAVA component is annotated with a plurality of JAVA objects provided by a JAVA application programming interface, wherein the plurality of JAVA objects set up communication and hold a state of the communication between the HTML5 application and the remote client; and
- wherein the Java component is implemented by a web real-time communication application to serve as a signaling gateway between the HTML5 application and the remote client.

17. The non-transitory computer readable storage medium of claim 15, where the JAVA component is deployed on a signaling software component that handles one or more web-centric signaling protocols.

18. The non-transitory computer readable storage medium of claim 15, wherein the plurality of JAVA objects are specified at different scopes and hence have different lifecycles.

19. The non-transitory computer readable storage medium of claim 15, wherein the plurality of JAVA objects include an object that enables the JAVA component to be instantiated by a container and be executing upon the container receiving the signaling messages from the HTML5 application.

20. The non-transitory computer readable storage medium of claim 18, wherein the container enables integration of the JAVA API with existing server side JAVA technologies.

* * * * *